United States Patent [19]
Hartling et al.

[11] Patent Number: 5,437,479
[45] Date of Patent: Aug. 1, 1995

[54] FLEXIBLE CONNECTION ARRANGEMENT FOR THE TWO PIPE PORTIONS PARTICULARLY FOR MOTOR VEHICLE EXHAUSTS

[75] Inventors: Peter Hartling, Geretsried; Hans Deinhard, Munich, both of Germany

[73] Assignee: Feodor Burgmann Dichtungswerke GmbH & Co., Wolfratshausen, Germany

[21] Appl. No.: 244,503
[22] PCT Filed: Sep. 27, 1993
[86] PCT No.: PCT/EP93/02622
 § 371 Date: May 27, 1994
 § 102(e) Date: May 27, 1994
[87] PCT Pub. No.: WO94/08169
 PCT Pub. Date: Apr. 14, 1994

[30] Foreign Application Priority Data
Oct. 6, 1992 [DE] Germany .......... 42 33 644.9

[51] Int. Cl.$^6$ .................................. F16L 11/12
[52] U.S. Cl. .......................... 285/49; 285/50; 285/226; 285/286; 285/300
[58] Field of Search ........... 285/114, 226, 227, 47, 285/49, 50, 286, 300

[56] References Cited

U.S. PATENT DOCUMENTS

| | | | |
|---|---|---|---|
| 3,232,640 | 2/1966 | Donkle | 285/226 X |
| 3,420,553 | 1/1969 | Poxon et al. | 285/49 |
| 4,659,117 | 4/1987 | Holzhausen et al. | 285/49 |
| 4,732,413 | 3/1988 | Bachmann et al. | 285/49 |
| 4,792,161 | 12/1988 | Usui | 285/114 X |
| 5,143,409 | 9/1992 | Lalikos | 285/114 X |
| 5,145,215 | 9/1992 | Udell | 285/49 |

FOREIGN PATENT DOCUMENTS

| | | |
|---|---|---|
| 0282689 | of 0000 | |
| 0327148 | 8/1989 | European Pat. Off. |
| 0432436 | 6/1991 | European Pat. Off. |
| 556019 | 8/1993 | European Pat. Off. ...... 285/49 |
| 2634535 | 1/1990 | France. |
| 1770667 | 10/1992 | U.S.S.R. ...... 285/49 |

*Primary Examiner*—Dave W. Arola
*Attorney, Agent, or Firm*—McAulay Fisher Nissen Goldberg & Kiel

[57] ABSTRACT

In a flexible connection arrangement for two pipe portions having a metallic bellows which is connected axially on either side in a gastight manner with connection pieces, the sides of the connection pieces facing the bellows are provided with radially widened end portions. Also provided are a damping insert, which extends coaxially relative to the bellows a along its length and is in a working connection therewith, and heat protection device for the bellows acting in the radially inward direction. The damping insert encloses the bellows radially outwardly such that the turns of the bellows contact the damping insert. The lateral end regions of the damping insert are held in the widened end portions without being fastened thereto and are supported radially outwardly by the latter. The connection pieces are connected with one another via a spring which surrounds the damping insert radially outwardly. The heat protection means are formed by a pipe segment which extends within the bellows coaxially relative to the bellows at a radial distance from the latter and which is fastened to the connection piece located in the front as viewed in the direction of flow.

17 Claims, 2 Drawing Sheets

FLEXIBLE CONNECTION ARRANGEMENT FOR THE TWO PIPE PORTIONS PARTICULARLY FOR MOTOR VEHICLE EXHAUSTS

BACKGROUND OF THE INVENTION a) Field of the Invention

The invention is directed to a flexible connection arrangement for two pipe portions, particularly in motor vehicle exhaust systems, with a metallic bellows which is connected axially on either side in a gastight manner with connection pieces in the form of substantially cylindrical sleeves or sockets, the sides of the connection pieces facing the bellows having radially widened end portions with substantially cylindrical end regions, the connection arrangement further comprising a damping insert, which extends coaxially to the bellows along its length and is in a working connection therewith, and heat protection means for the bellows acting in the radially inward direction.

b) Description of the Relevant Art

Such flexible connection arrangements are used in exhaust systems, particularly in motor vehicles, in the form of intermediate pieces serving to connect the pipe portions attached thereto in a resilient, articulated and damped manner and to eliminate vibrational interaction between these parts, i.e. to uncouple relative movements, oscillations and vibrations from the adjacent structural component parts. In other respects, the exhaust lines are constructed as rigid systems so that the matter of resilient uncoupling is of considerable importance.

With regard to connection arrangements of this type, increasing attention has lately been centered on questions relating to good sound-proofing, effective heat insulation and, in particular, efficient sealing against undesirable emission of exhaust gases from the exhaust line, particularly if the connection arrangements in question are installed upstream of the catalytic converter as viewed in the direction of flow of the exhaust gases.

A great many flexible connection arrangements of this type for pipe portions are known, including those in which sealing against unwanted emission of exhaust gases is effected by means of a metallic bellows whose two ends are tightly connected, respectively, with the two pipe portions.

A flexible connection arrangement which makes use of a flexible bellows directly surrounded by a braided tube of metal wire is known from EP-A-0 432 436. The bellows and braided tube are arranged inside a cylindrical support ring and pressed together with one another and with the latter at the ends, the parts being interconnected by provisional stitches. In addition, at least one flexible damping member which proceeds from one end of the connection arrangement and is movable relative to the braided tube is provided for effectively absorbing the oscillations and vibrations occurring during operation. The damping member produces the desired damping action by frictional contact with the braided tube surrounding the bellows. For example, this flexible damping member may be constructed as a spring (e.g., a coil spring or helical spring) which has frictional contact with and is displaceable on the braided tube, one end of the spring being fastened to an end of the connection arrangement, while its other end is arranged on the braided tube so as to be freely displaceable. This known connection arrangement has a somewhat complicated design, since both axial ends of the braided tube must be tightly and securely pressed together with the respective ends of the bellows and supporting ting. Moreover, the braided tube must completely absorb all axial forces, which can result in a tear in its connection points at the ends or even in the braided tube itself. In addition, such metallic braided tubes have only a very limited ability to rotate and become frayed easily. It is also difficult to assemble known connection arrangements of this type, particularly as concerns the frictional contact of the damping spring at the braided tube.

A flexible connection arrangement of the type mentioned in the introduction is described in EP 0 282 689 A2. In this known flexible connection element, the bellows and damping insert are arranged coaxially relative to one another, the radially inwardly directed end regions of the folds of the bellows being embedded in the damping insert to a certain penetration depth. The working connection thus achieved between the damping insert and the convolutions or turns of the bellows results in a very efficient damping of oscillations in the bellows and a uniform distribution of oscillations along the entire length of the bellows. In addition, the damping insert acts at the same time as an insulating layer and as heat protection means acting toward the inside of the bellows. For this purpose, the radial inner surface of the damping insert is formed by a metal tube in the form of a clasp sleeve which is arranged coaxially to the damping insert and is welded at both ends inside the inner circumference of one of the two pipe portions to be connected. The outside of the bellows is enclosed by a braided metal tube for external protection against mechanical damage and dirt. In the region of its outer diameter, the ends of the metal bellows are welded to the radially widening end portions of the closing ends along with the tube enclosing the bellows. The known flexible connection arrangement provides complete sealing of the connection points with good sound insulation and heat insulation. However, the known connection element has a very complicated design and requires four circumferential welds, two of which serve to fasten the tube, bellows and connection piece simultaneously. Specifically welds of this type could easily lead to warping or distortion and to welding stresses which affect both the bellows and the metallic tube enclosing it and generate positive tensions, for example, which can also result in impaired operation particularly in sensitive metallic bellows. Owing to its complicated design, this known flexible connection arrangement is also relative cumbersome and difficult to assemble. Axial forces must also be absorbed entirely either by the inner metallic tube or by the outer metallic tube surrounding the bellows, which can lead to cracks in the welds or tearing of the metallic tube in question when considerable axial relative movements occur between the metallic parts to be connected. These metallic tubes also have only a very limited elongation capacity and fray easily.

OBJECT AND SUMMARY OF THE INVENTION

Therefore, a primary object of the present invention is to further develop a flexible connection arrangement of the type mentioned above so that it has a simpler construction, is easier to assemble and is, at the same time, better suited to absorb axial relative movements of the pipe portions to be connected while remaining fully tight against gas.

This object is met, according to the invention, in a connection arrangement of the generic type in that the damping insert encloses the bellows radially on the outside such that the turns of the bellows contact the damping insert, further in that the axial end regions of the damping insert are accommodated in the widened end portions of the connection pieces without being fastened thereto and are supported radially outwardly by the cylindrical end regions of the connection pieces, further in that the connection pieces are connected with one another via a spring which surrounds the damping insert radially outwardly, and in that the heat protection means is formed by a pipe segment which extends coaxially within the bellows at a radial distance from the latter and which is fastened to the connection piece situated upstream as viewed in the direction of flow.

The connecting means according to the invention provides a flexible connection arrangement having an appreciably simpler construction than that of the generic arrangement and eliminating the need for four circumferential welds. Welding is advisably carried out only for fastening the ends of the bellows to the respective connection pieces. In so doing, the pipe segment forming the heat protection means can also be welded, at the same time and with the same weld, to the connection piece situated upstream in the direction of flow. In addition, the damping insert is no longer fastened at the lateral connection pieces. On the contrary, it is arranged and received within the annular space formed between the cylindrical end regions of the connection pieces and the upper side of the bellows turns without the use of special fastening means. In so doing, these cylindrical end regions support the damping insert outwardly while the turns of the bellows contact its radially inward side. Since the turns of the bellows only make contact with the damping insert and are not pressed into or embedded in the latter as in the sealing arrangement of the generic type, they are free to slide along at the inside of the damping insert in the longitudinal direction of the connection arrangement so that relative movements occurring in the axial direction can be compensated for by the bellows virtually without hindrance. As a result of the externally arranged connection spring for connecting the two connection pieces, the two end regions of the connection spring being fastened, respectively, to one of the two connection pieces, all forces to be absorbed in the axial direction are transmitted via this spring and a pretensioning in a determined initial center position is effected at the same time. The outward enclosing of the bellows by the damping insert in combination with the lateral accommodation of the latter in the widened end portions of the connection pieces also provides continuous effective protection of the bellows against undesirable external influences.

Considered as a whole, the connection arrangement according to the invention offers a surprisingly simple construction with only a few points of attachment and at the same time enables a particularly uncomplicated and rapid assembly of the connection arrangement. In addition, the arrangement according to the invention makes it easy to modify the overall dimensions and operating characteristics of the overall arrangement to adapt to different requirements depending on application, e.g. for installation in different motor vehicles. Moreover, greater tolerances may be allowed for on the whole in the relative movements of the interconnected structural component parts without resulting in axial stresses or damage to the fastening points due to the limited elongation capacity of an outer and/or inner metallic tube. At the same time, the bellows may also have a smaller construction compared to the generic solution, since it has a comparatively small mean diameter. The degree of radial pretensioning of the radially outer end regions of the folds of the bellows is selected so as to permit, just barely, unimpeded displacement of the turns of the bellows at the inside of the damping insert, while still ensuring an effective damping action of the damping insert on the bellows.

The spring is preferably arranged at a distance from the outer circumference of the damping insert (as seen in the radial direction). This distance is preferably approximately equal to the wall thickness of the end regions of the end portions connected by the spring. In this way, an advantageous complete separation of functions is achieved between the connection spring on the one hand and the damping insert on the other hand without reciprocal influence of any kind.

However, the spring can also be arranged on the outside of the damping insert so as to rest on the outer surface area of the damping insert, thus providing radially outward support of the damping insert at the same time.

The bellows itself can be constructed in any suitable manner, but is provided in a particularly preferred manner with turns similar to the thread of a screw or corrugations.

In a preferred further development of the invention, the widened end portions of the connection pieces have a first annular portion which is directed radially outwardly and is adjoined (proceeding from its outer end) by an intermediate portion which widens outward obliquely in a conical manner toward the end of the respective connection pieces on the bellows side and, in turn, passes into the respective cylindrical end region of the connection piece in question. This results in widened end portions of straightforward construction which are easy to manufacture and have excellent useful characteristics in combination with the internal bellows and the damping insert arranged therebetween.

In a particularly preferred manner, the spring serving to connect the two connection pieces is constructed as a helical spring. Such a helical spring can effectively absorb considerable axial and torsional forces simultaneously, can be produced economically and assembled particularly rapidly and simply.

The damping insert may be produced from any work material suitable for the desired damping and for other marginal conditions. In a particularly preferred manner, however, the damping insert is made from a braided, woven or knitted metallic fabric or from compressed metallic wire. Good heat radiation can be achieved in particular by using a metallic knitted fabric. For certain applications, it may be particularly advisable to provide the damping insert with an admixture of glass fibers or mineral fibers and/or with a heat-insulating layer or to produce the damping insert itself from a material having a simultaneous damping and heat-insulating effect so as to reduce the light-off time of the catalyst when used in exhaust systems provided with catalytic converters. The damping insert is preferably provided with such a heat-insulating layer on its radially inner circumferential surface.

The bellows can be attached to the two lateral connection pieces in any manner suited to ensure a circumferential, completely gastight fastening. It is particularly preferable to weld the bellows to the two connection pieces so as to achieve complete gastightness.

In another advantageous further development of the invention, the radially outer circumferential surface of the damping insert can be provided with a protective coating which protects the damping insert against external influences and damage resulting therefrom.

In another preferred construction of the invention, the damping insert is coated on its radially inner circumferential surface with a heat-resistant sliding layer so as to facilitate and promote a displacement of the turns of the bellows contacting the inner circumferential surface of the damping insert relative to the damping insert.

The attachment of the two axial end regions of the spring to the respective connection piece may also be effected in any manner suitable for the transmission of the anticipated forces. However, in a particular preferred manner, this fastening is effected by spot welding, a plurality of spot welds being provided along each end region.

There follows, with reference to the drawings, a more detailed description of the invention in principle by way of example:

DESCRIPTION OF THE PREFERRED EMBODIMENTS

Figure 1:
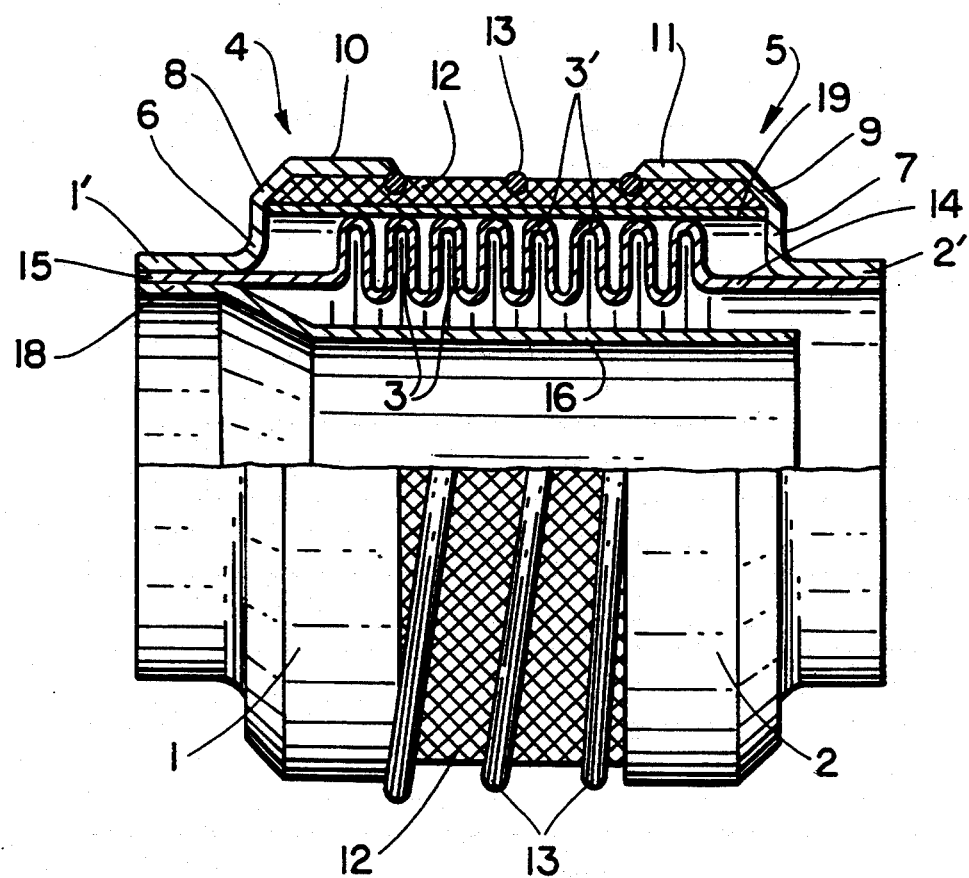
FIG. 1 shows a longitudinal section through a basic diagram of a connection arrangement, according to the invention, before installation.
Figure 2:
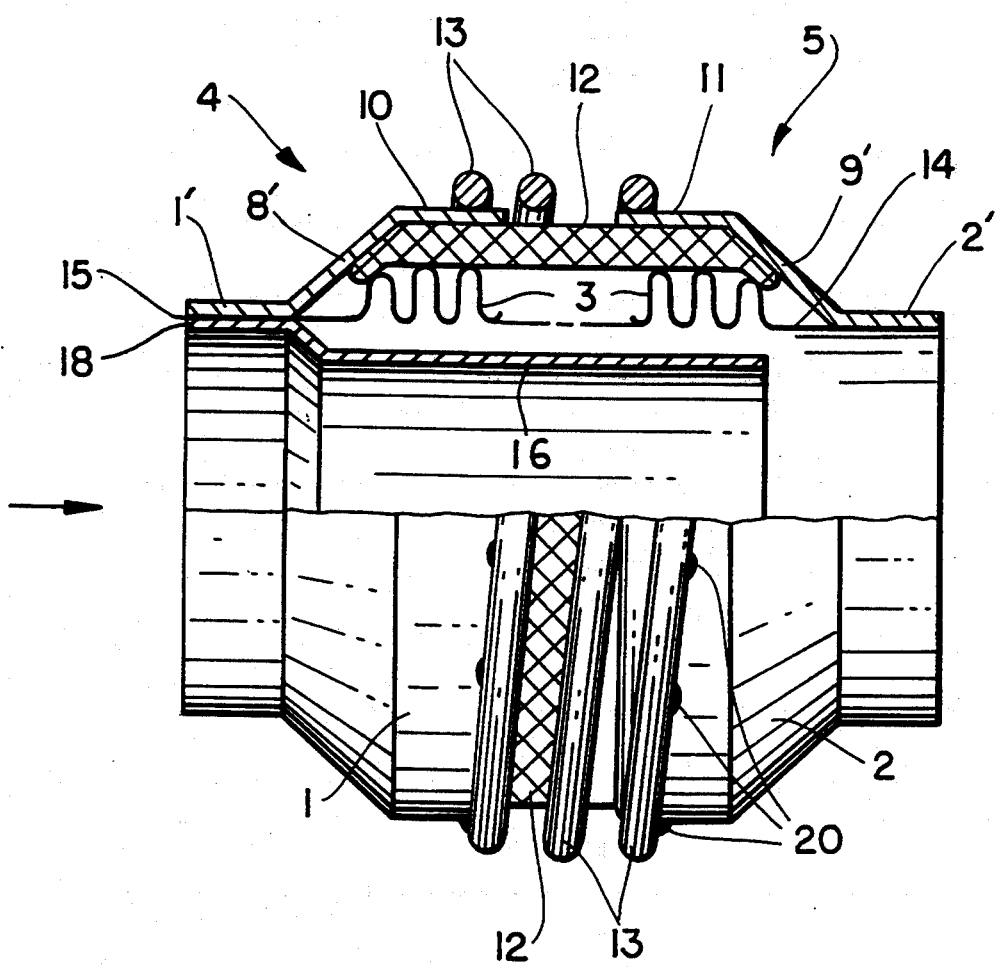
FIG. 2 shows a longitudinal section as in FIG. 1, but through an alternative embodiment form.

The connection arrangements shown in FIGS. 1 and 2 serve as flexible connections between two pipe portions. Each connection arrangement has two lateral connection pieces 1, 2. Each end of a bellows 3 is fastened in a gastight manner respectively to a connection piece 1, 2, the bellows 3 being arranged between the latter and extending axially thereto (identical or corresponding parts in the two figures are provided with identical reference numbers).

In the embodiment forms shown in the drawing, the connection pieces 1, 2 have a cylindrical pipe segment 1' and 2', respectively, at their end regions remote of the bellows 3. Radially widening end portions 4, 5 are arranged at that end of the pipe segments 1' and 2', respectively, which faces the bellows 3. In the embodiment example shown in FIG. 1, each end portion 4, 5 is formed by a first annular portion 6 and 7, respectively, which extends outward radially. At its radially outer end, each annular portion 6 and 7 passes into an intermediate portion 8 and 9, respectively, which slopes upward and widens in a conical manner toward the end of the respective connection piece 1 and 2 on the bellows side. A cylindrical end region 10 and 11, respectively, adjoins the radially outer end of the respective intermediate portion 8 and 9. Instead of radial annular portions, the end portions 4, 5 in the embodiment form according to FIG. 2 have only a first intermediate portion 8' and 9' which widens in a conical manner radially with increasing distance from the respective cylindrical pipe portion 1' and 2'. Again, a cylindrical end region 10 and 11, respectively, adjoins each intermediate portion 8' and 9'. The length of the cylindrical end regions 10, 11 is identical in both embodiment forms shown in the drawing and they also have an identical thickness d and identical diameter, their free ends being disposed at a distance from one another as can be seen from FIGS. 1 and 2.

The bellows 3 is enclosed radially outwardly by a damping insert 12, the outer end regions of the turns 3' of the bellows 3 contacting the radial inner circumferential surface of the damping insert 12 with pretensioning. A helical spring 13 is arranged on the outside of the damping insert 12. One end portion of the helical spring 13 is fastened to an end region 10 of one connection piece 1 and the other end portion is fastened to the cylindrical end region 11 of the other connection piece 2. The fastening is effected in such a way that the end regions of the spring are spot-welded to the respective cylindrical end regions 10 and 11 by means of a plurality of spot welds 20. In the embodiment example according to FIG. 1, the spring 13 contacts the outer circumference of the damping insert 12 in such a way that its turns are even embedded somewhat in the surface of the damping insert. However, in the embodiment example in FIG. 2, the spring 13 is situated at a radial distance x from the outer circumference of the damping insert 12, this distance being equal to the thickness d of the two (identically thick) end regions 10 and 11. The ends of the spring 13 contact the two end regions 10 and 11 externally and are fastened there by means of spot welds 20.

The damping insert 12 is formed substantially as a cylindrical ring which is provided at its axial end faces with a bevel adapted to the slope of the associated intermediate portion 8, 9 and 8', 9' of the corresponding end portion 4 and 5, respectively.

In the initial position (state at installation) shown in the drawings in which the spring 13 is relaxed, the damping insert 12 fills up the entire annular region situated between the upper side of the turns 3' of the bellows 3 and the underside of the cylindrical end regions 10, 11 and conically widening intermediate portions 8, 9 and 8', 9' of the end portions 4, 5. In so doing, the sealing insert 12 is not provided with any special means of attachment to the widening end regions 4, 5 of the connection pieces 1, 2. When the connection pieces 1 and 2, for example, are moved apart axially in the installed state, the damping insert 12, which is held in a pretensioned state between the turns 3' and the cylindrical end regions 10, 11 supporting it axially on the outside, can readily slide relative to the cylindrical end regions 10 and 11 as a result of occurring forces, and the turns 3' of the bellows 3 can likewise execute a sliding movement on the inside of the damping insert 12.

In the embodiment example shown in FIG. 1, a temperature-resistant sliding layer 19, e.g. in the form of a sliding foil (e.g., aluminum foil), is arranged on the radial inner side of the damping insert 12 in order to facilitate this sliding movement. This sliding layer 19 permits the turns 3' to slide relative to the damping insert 12 in spite of the contact pressure forces by which the turns 3' of the bellows 3 are pressed against the damping insert 12. Of course, such a sliding layer could also be provided in a form similar to that of the embodiment form shown in FIG. 2.

Heat protection means in the form of a pipe segment 16 (telescopic pipe) whose front end region, as considered in the direction of flow, is fastened to the connection piece 1 within the cylindrical entry region 1' of the latter are provided below the bellows 3 concentrically thereto, but so as to be offset radially inwardly at a distance thereto.

The bellows 3 has, at both axial ends, a cylindrically shaped end portion 14, 15 which extends up to the end of the respective connection piece 1 and 2 remote of the bellows as is clearly shown in FIG. 1 (in principle, this applies equally to FIG. 2, although the bellows is only shown schematically in the latter). The cylindrical end region 15 of the bellows 3, together with the end portion 18 of the pipe segment 16 contacting the latter, is fastened to the connection piece 1 in a suitable manner, e.g. by welding. The cylindrical end portion 14 is connected at the other end of the bellows 3 with connection piece 2, also preferably by welding.

In the embodiment examples shown in the drawing, the damping insert 12 is produced from a knitted metallic fabric interspersed with glass fibers or mineral fibers (not shown in the drawing). It is also possible to arrange another layer (also not shown in the drawing) on the outside of the damping insert 12 to protect against undesirable external influences.

The pipe segment 16 serving as heat protection means extends axially from the front connection piece 1 e.g. to the location where the annular portion 7 on the other connection piece 2 widens outward radially. The radial position of the pipe segment 16 relative to the rest of the arrangement is selected in such a way that the end of the pipe segment 16 never contacts the cylindrical end portion 14 of the bellows 3, even when the bending of the two connection pieces 1 and 2 relative to one another reaches the maximum degree for which the arrangement is designed. The fastening of the heat protection means at the front connection piece 1, i.e. the connection piece 1 arranged upstream as seen in the direction of flow (arrow in FIGS. 1 and 2) of the hot gas flowing through the arrangement, ensures that the gap formed between the free end of the pipe segment 16 and the end region of the bellows 3 lies further downstream so that gases which may pass through this gap and then reach the bellows 3 are somewhat cooler than would be the case if the heat protection means 16 were fastened at the rear connection piece 2.

While the foregoing description and drawings represent the preferred embodiments of the present invention, it will be obvious to those skilled in the art that various changes and modifications may be made therein without departing from the true spirit and scope of the present invention.

What is claimed is:

1. In a flexible connection arrangement for two pipe portions, particularly in motor vehicle exhaust systems, having a metallic bellows which is connected axially on either side in a gastight manner with connection pieces in the form of substantially cylindrical sleeves, wherein the sides of the connection pieces facing the bellows have radially widened end portions with substantially cylindrical end portions, also having a damping insert which extends coaxially relative to the bellows along its length and is in a working connection therewith, and heat protection means for the bellows acting in the radially inward direction, the improvement comprising:
   said damping insert enclosing the bellows radially outwardly such that turns of the bellows contact said damping insert, axial end regions of said damping insert being supported radially outwardly by cylindrical end regions of said widened end portions of said connection pieces and being held in said widened end portions without being fastened thereto by said bellows and said widened end portions;
   said connection pieces being connected with one another via a spring which surrounds the damping insert radially outwardly and applies compressive force thereto; and
   said heat protection means being formed by a pipe segment which extends within the bellows coaxially relative to the bellows at a radial distance from said bellows and which is fastened to the connection piece located in the front as viewed in the direction of flow.

2. The flexible connection arrangement according to claim 1, wherein the spring is arranged at a radial distance (x) from the outer circumference of the damping insert.

3. The flexible connection arrangement according to claim 2, wherein the helical spring is a helical spring and is fastened to the cylindrical end regions of each widened end portion by spot welding.

4. The flexible connection arrangement according to claim 2, wherein the radial distance (x) of the spring from the outer circumference of the damping insert is equal to the wall thickness (d) of the cylindrical end regions of the widened end portions.

5. The flexible connection arrangement according to claim 1, wherein the spring rests on the outer circumference of the damping insert.

6. The flexible connection arrangement according to claim 1, wherein the bellows is provided with turns shaped like the thread of a screw.

7. The flexible connection arrangement according to claim 1, wherein the widened end portions of the connection pieces have a first annular portion which is directed radially outwardly and is adjoined at its outer end by an intermediate portion which widens outward obliquely in a conical manner toward the end of the connection piece on the bellows side and, in turn, is adjoined to the respective cylindrical end region respective connection piece.

8. The flexible connection arrangement according to claim 1, wherein the spring connecting the two connection pieces is constructed as a helical spring.

9. The flexible connection arrangement according to claim 1, wherein the damping insert has a heat-insulating layer.

10. The flexible connection arrangement according to claim 9, wherein the radially inner circumferential surface of the damping insert is coated with said heat-insulating layer.

11. The flexible connection arrangement according to claim 1, wherein the bellows is welded to both connection pieces.

12. The flexible connection arrangement according to claim 1, wherein the radially outer circumferential surface of the damping insert is provided with a protective coating.

13. The flexible connection arrangement according to claim 1, wherein the damping insert is a braided, woven or knitted metallic fabric.

14. The flexible connection arrangement according to claim 1, wherein the damping insert is made of compressed metal wire.

15. The flexible connection arrangement according to claim 1, wherein the damping insert has an admixture of glass fibers or mineral fibers.

16. The flexible connection arrangement according to claim 1, wherein the damping insert is coated with a heat-resistant layer with good sliding characteristics on its radially inner circumferential surface.

17. The flexible connection arrangement according to claim 1, wherein the damping insert is made from a material having both damping and heat-insulating properties.

* * * * *